United States Patent [19]
Umeno et al.

[11] 3,864,430
[45] Feb. 4, 1975

[54] RUBBER COMPOSITIONS CONTAINING CIS-POLYBUTADIENE AND 1,2-POLYBUTADIENE

[75] Inventors: Masashi Umeno, Kawasaki; Mitsuo Ichikawa, Hachioji; Yasumasa Takeuchi, Yokohama; Eiichiro Shiratsuchi, Tokyo, all of Japan

[73] Assignee: Japan Synthetic Rubber Co., Ltd., Tokyo, Japan

[22] Filed: Nov. 20, 1972

[21] Appl. No.: 308,093

[52] U.S. Cl............ 260/894, 260/2.5 L, 260/42.47
[51] Int. Cl.......................... C08d 9/04, C08f 29/08
[58] Field of Search........................... 260/894, 94.3

[56] References Cited
UNITED STATES PATENTS

| | | | |
|---|---|---|---|
| 3,166,609 | 1/1965 | Wilder | 260/894 |
| 3,281,389 | 10/1966 | Hirshfield | 260/894 |
| 3,498,963 | 3/1970 | Ichikawa et al. | 260/94.3 |

FOREIGN PATENTS OR APPLICATIONS

| | | | |
|---|---|---|---|
| 835,752 | 5/1960 | Great Britain | 260/94.3 |
| 854,615 | 11/1960 | Great Britain | 260/94.3 |

*Primary Examiner*—Murray Tillman
*Assistant Examiner*—J. Ziegler
*Attorney, Agent, or Firm*—Ladas, Parry, Von Gehr, Goldsmith & Deschamps

[57] ABSTRACT

A rubber composition consisting essentially of 97 to 80 percent by weight of cis-polybutadiene and 3 to 20 percent by weight of 1,2-polybutadienes having crystallinity of 5 percent or higher and a 1,2-addition units content of 70 percent or higher. Said rubber composition is prevented from cold-flow.

6 Claims, No Drawings

RUBBER COMPOSITIONS CONTAINING CIS-POLYBUTADIENE AND 1,2-POLYBUTADIENE

This invention relates to a cis-polybutadiene composition which is prevented from cold-flow. More particularly, this invention relates to a cis-polybutadiene composition which is prevented from cold-flow and which consists essentially of cis-polybutadiene and 1,2-polybutadiene.

For recent several years, cis-polybutadiene (referred to hereinafter as cis-BR) has been commercially available, and the cis-BR has a higher tendency of coldflow than other synthetic rubbers, for example, styrene-butadiene rubber, and are inconvenient in handling because the package of the composition gets out of shape during storage particularly in summer, and unvulcanized intermediate products are deformed.

In order to remove said disadvantages, the following ways have been considered: using cis-BR having a higher molecular weight or having a wider molecular weight distribution, and increasing the amount of branched chains in the molecule. However, these ways require complicated polymerization operation, resulting in an increase of production cost. Therefore, these ways have not been desired. In addition, blending polyethylene into the cis-BR has been proposed (see Japanese Pat. No. 531,921). However, the composition obtained by this way is inferior in properties other than cold-flow though it is improved in cold-flow.

The present inventors have done extensive research on cis-BR to find that by blending cis-BR with 1,2-polybutadiene highly compatible therewith, the cold-flow of cis-BR is greatly improved.

It is the object of the invention to provide a cis-polybutadiene composition which is prevented from cold-flow.

According to the present invention, there is provided a cis-polybutadiene composition which consists essentially of 97 to 80 percent by weight of cis-polybutadiene and 3 to 20 percent by weight of 1,2-polybutadiene having a 1,2-addition units content of 70 percent or higher and crystallinity of 5 percent or higher.

The 1,2-polybutadiene used in this invention has a 1,2-addition units content of 70 percent or higher, preferably 85 percent or higher, and crystallinity of 5 percent or higher, preferably 10 to 50 percent.

Its molecular weight can be selected from a wide range, so both liquid and solid polymers may be used, though it is preferably to use a polymer having an intrinsic viscosity ($[\eta]$) of 0.7 dl/g or higher (determined in toluene at 30°C). Said 1,2-polybutadiene can be prepared by the methods disclosed in U.S. Pat. Nos. 3,498,963 and 3,522,332.

When the 1,2-addition units content or the crystallinity is outside the above-mentioned range, the effect of this invention cannot be obtained.

In this invention, the proportion of cis-BR to the 1,2-polybutadiene is 97–80/3–20 (weight ratio), and when the amount of the 1,2-polybutadiene is smaller than 3 percent by weight of the composition, no substantial effect of this invention can be obtained. Further, up to 20 percent by weight of the 1,2-polybutadiene is sufficient to prevent the cold flow of cis-BR.

Commercially available cis-BR may be used as the cis-BR in this invention, and an oil-extended cis-BR may also be used.

In this invention, the method of blending the 1,2-polybutadiene with cis-BR has no particular restriction. For instance, solutions of both components may be blended with each other followed by removing the solvents, or alternatively, both components in the form of solids may be blended with each other by a conventional method, for example, by means of roll, Banbury's mixer or kneader to obtain a similar result.

The cis-polybutadiene composition of this invention is greatly improved in cold flow and also improved in green strength, extrudability and mill shrinkage. Further, the vulcanizate of the composition is improved in physical properties, such as hardness and the like. Therefore, the composition of this invention is very usefull.

It is, of course, possible to further incorporate into the composition of this invention at least one conventional compounding ingredient, such as reinforcing agents, fillers, extender oils, pigments, vulcanizing agents, vulcanizing accelerators, vulcanizing activators, antioxidants, ultraviolet absorbers, blowing agents, odorants, softening agents, etc.

The invention is further explained below in more detail with reference to Examples, which are not by way of limitation but by way of illustration.

The characteristic properties of the 1,2-polybutadienes used in the Examples are as follows:

|   | 1,2-Addition units content (%) | Crystallinity (%) | Intrinsic viscosity ($[\eta]$, 30°C in toluene) |
|---|---|---|---|
| Ⓐ | 92.3 | 25 | 1.70 |
| Ⓑ | 87.0 | 15 | 2.27 |
| Ⓒ | 96.0 | 39 | 0.87 |
| Ⓓ | 81.7 | 0 | 2.05 |
| Ⓔ | 58.9 | 0 | 1.00 |

The micro-structures of the above polybutadienes were measured by the infrared absorption spectrum method of D. Moreo, et al., [Chimie et Ind., 41, 758 (1959)]. The crystallinity was determined by the density measurement method in which the following equation was used:

$$(1/d) = [(X/d_{cr}) + (1 - X/d_{am})]$$

where
$d$ : density of the specimen measured at 20°C
$d_{cr}$: density of the crystalline region
$d_{am}$: density of the amorphous region
$X$ : crystallinity in percent The value of $d_{cr}$ used was that of the crystalline 1,2-polybutadiene calculated by Natta from X-ray experiments to be 0.963 [G. Natta: J. Polymer Sci., 20, 251 (1956)]. The value of $d_{am}$ used was 0.892, or the density of the 1,2-polybutadiene obtained by the synthesizing process proposed in U.S. Pat. No. 3,498,963 and which was found completely amorphous by X-ray analysis.

EXAMPLE 1

Mixtures according to the compounding recipes (parts by weight) shown in Table 1 were blended by rolls to obtain various rubber compositions.

Table 1

| Sample No.<br>Compounding ingredients<br>(parts by weight) | 1 | 2 | 3 | 4 | 5 | 6 | 7 | 8 | 9 | 10 | 11 | 12 |
|---|---|---|---|---|---|---|---|---|---|---|---|---|
| Cis-BR (JSR BRO1)* | 100 | 97 | 94 | 90 | 80 | 97 | 94 | 90 | 80 | 90 | 90 | 95 |
| 1,2-Polybutadiene | | | | | | | | | | | | |
| A | | 3 | 6 | 10 | 20 | | | | | | | |
| B | | | | | | 3 | 6 | 10 | 20 | | | |
| C | | | | | | | | | | 10 | | |
| D | | | | | | | | | | | 10 | |
| E | | | | | | | | | | | | 5 |
| Diethylthiourea | | | | | | 0.3 | | | | | | |
| Zinc oxide | | | | | | 0.4 | | | | | | |
| Stearic acid | | | | | | 3.6 | | | | | | |
| Accelerator CZ<br>(N-Cyclohexyl-2-benzothiazyl-sulfenamide) | | | | | | 1.6 | | | | | | |
| Accelerator TET<br>(Tetraethylthuram disulfide) | | | | | | 0.2 | | | | | | |
| Aldol-α-naphthyl-amine | | | | | | 1.7 | | | | | | |
| Carbon black (ISAF) | | | | | | 50 | | | | | | |
| Sulfur | | | | | | 0.53 | | | | | | |
| Remarks | Comparative Example | | | | | Example | | | | | | Comparative Example |

Note: *Cis-polybutadiene manufactured by Japan Synthetic Rubber Co., Ltd.

The physical properties of the resulting compositions and those of the vulanizates obtained by vulcanizing these compositions at 150°C. for 15 minutes were as shown in Table 2. These tests were carried out conforming to JIS K6301.

EXAMPLE 2

Two compositions in which the ratios of cis-BR (JSR BRO1)/1,2-polybutadiene A were 95/5 (sample No. 13) and 85/15 (sample No. 14), respectively, were prepared by using otherwise the same compounding recipe as in Example 1. The results of measurements of the physical properties were as shown in Table 3.

Table 2

| Sample No. | Cold flow index | Mill shrinkage (%) | 300 % Modulus (kg/cm$^2$) | Tensile strength (kg/cm$^2$) | Elongation (%) | Hardness | Tear strength (kg/cm$^2$) | Compression permanent set (%) | Impact resilience (%) | Remarks |
|---|---|---|---|---|---|---|---|---|---|---|
| 1 | 171 | 63.8 | 56 | 196 | 710 | 60 | 84 | 40 | 46 | Comparative Example |
| 2 | 146 | 58.4 | 55 | 202 | 730 | 62 | 92 | 40 | 45 | |
| 3 | 97 | 52.0 | 60 | 206 | 730 | 63 | 93 | 40 | 45 | |
| 4 | 66 | 48.0 | 67 | 203 | 700 | 65 | 92 | 43 | 44 | |
| 5 | 10 | 46.5 | 79 | 213 | 740 | 72 | 90 | 46 | 42 | Example |
| 6 | 141 | 56.2 | 60 | 203 | 710 | 62 | 82 | 36 | 46 | |
| 7 | 92 | 53.0 | 64 | 207 | 740 | 63 | 101 | 36 | 46 | |
| 8 | 64 | 49.0 | 60 | 207 | 760 | 63 | 96 | 38 | 45 | |
| 9 | 10 | 45.8 | 76 | 208 | 720 | 68 | 97 | 39 | 45 | |
| 10 | 70 | 46.5 | 89 | 210 | 640 | 67 | 90 | 45 | 44 | |
| 11 | 150 | 50.5 | 62 | 186 | 640 | 60 | 84 | 40 | 46 | Comparative |
| 12 | 151 | 54.5 | 62 | 179 | 660 | 60 | 82 | 40 | 46 | Example |

Note: Cold flow index was measured by the method described in Japanese Pat. No. 531,921.

Table 3

| Item of test<br>Sample No. | Cold flow index | Green strength (1) | | | | | | Extrudability (2) | | | | | Hardness (3) | |
| | | At room temperature | | At 40°C. | | At 80°C. | | Linear shrinkage after 24 hours (%) | Rate of extrusion (cc/min.) | die shrinkage (%) | die swelling (%) | Evaluation of shape factors of extrudate | vulcanized at 140°C for 20 min. | |
| | | Tensile strength (kg/cm$^2$) | Elongation (%) | Tensile strength (kg/cm$^2$) | Elongation (%) | Tensile strength (kg/cm$^2$) | Elongation (%) | | | | | | | |
| 1 | 171 | 0.8 | 850 | 0.8 | 560 | 0.5 | 480 | 16.0 | 132.1 | 56.3 | 128.3 | 9(2,2,2,3) | 46 | Comparative Example |
| 13 | 105 | 0.9 | 760 | 0.9 | 510 | 0.5 | 510 | 14.0 | 133.2 | 54.6 | 119.7 | 10(2,3,2,3) | 50 | Example |
| 14 | 42 | 1.7 | 260 | 1.8 | 530 | 0.8 | 450 | 11.9 | 135.5 | 53.1 | 112.2 | 12(3,3,2,4) | 55 | |

Note:— (1) JIS K6301
(2) ASTM D2230-68
Evaluation of shape factors of the extrudate:
Full marks = 16 points (4 points for each of a, b, c and d).
  a: Swelling state.
  b: Continuity of edge.
  c: Surface appearance.
  d: Shape at corners.
Conditions of extrusion:
  Barrel temperature : 70°C.
  Die temperature: 110°C.
  Number of revolution of screw: 21 rpm.
(3) JIS K6301

What is claimed is:

1. A rubber composition which consists essentially of a blend of 97 to 80 percent by weight of cis-polybutadiene and 3 to 20 percent by weight of 1,2-polybutadiene having a 1,2-addition units content of 70 percent or higher and crystallinity of 5 percent or higher.

2. A rubber composition according to claim 1, wherein the 1,2-polybutadiene has a 1,2-addition units content of 85 percent or higher.

3. A rubber composition according to claim 1, wherein the 1,2-polybutadiene has crystallinity of 10 to 50 percent.

4. A rubber composition according to claim 2, wherein the 1,2-polybutadiene has crystallinity of 10 to 50 percent.

5. A rubber composition according to claim 1, wherein the 1,2-polybutadiene has an intrinsic viscosity of 0.7 dl/g or higher (determined in toluene at 30°C).

6. A vulcanizate of the rubber composition according to claim 1.

* * * * *